US012539256B2

(12) United States Patent
Iino et al.

(10) Patent No.: US 12,539,256 B2
(45) Date of Patent: Feb. 3, 2026

(54) CONNECTOR

(71) Applicant: DAIWA CAN COMPANY, Tokyo (JP)

(72) Inventors: Toshio Iino, Sagamihara (JP); Toshihiro Asano, Sagamihara (JP)

(73) Assignee: DAIWA CAN COMPANY, Tokyo (JP)

( * ) Notice: Subject to any disclaimer, the term of this patent is extended or adjusted under 35 U.S.C. 154(b) by 315 days.

(21) Appl. No.: 18/350,360

(22) Filed: Jul. 11, 2023

(65) Prior Publication Data

US 2023/0346643 A1 Nov. 2, 2023

Related U.S. Application Data

(63) Continuation of application No. PCT/JP2021/042266, filed on Nov. 17, 2021.

(30) Foreign Application Priority Data

Jan. 14, 2021 (JP) ................................ 2021-004407

(51) Int. Cl.
*A61J 1/20* (2006.01)

(52) U.S. Cl.
CPC ........... *A61J 1/2048* (2015.05); *A61J 1/2096* (2013.01)

(58) Field of Classification Search
CPC ...................... A61J 1/2096; A61J 1/201; A61J 1/2048-2065; A61M 39/1011; A61M 2039/1027
See application file for complete search history.

(56) References Cited

U.S. PATENT DOCUMENTS 11,344,475 B2 5/2022 Asano et al.
2007/0088327 A1* 4/2007 Guala .................. A61M 39/10 604/533

(Continued)

FOREIGN PATENT DOCUMENTS

CA 2949748 A1 1/2016
CN 106659878 A 5/2017

(Continued)

OTHER PUBLICATIONS

International Preliminary Report on Patentability mailed Jul. 4, 2023 in International Application PCT/JP2021/042266.

(Continued)

*Primary Examiner* — Susan S Su
(74) *Attorney, Agent, or Firm* — Polsinelli LLP

(57) ABSTRACT

The connector includes a housing having a first casing and a second casing; a connection member formed into a cylinder an interior of which constitutes a first flow path L1 and arranged in the housing rotatably around an axis, a screw portion being formed on the connection portion in such a manner that the syringe can be screwed in; a flow path member arranged in the connection member; and a ratchet having a gear arranged in the connection member and having a plurality of teeth in the peripheral direction and a pawl arranged in the housing, and engaged in a protruding direction of the protrusion of the first casing from the first end surface with the restricting surface of the gear rotating in the direction of the syringe being screwed in so as to restrict the rotation of the gear.

6 Claims, 18 Drawing Sheets

(56) References Cited

U.S. PATENT DOCUMENTS

| | | | |
|---|---|---|---|
| 2013/0066293 | A1 | 3/2013 | Garfield et al. |
| 2013/0187381 | A1 | 7/2013 | Guala |
| 2016/0106967 | A1 | 4/2016 | Guala |
| 2017/0151426 | A1 | 6/2017 | Guala |
| 2019/0076641 | A1 | 3/2019 | Guala |
| 2020/0038289 | A1 | 2/2020 | Asano et al. |

FOREIGN PATENT DOCUMENTS

| | | | |
|---|---|---|---|
| CN | 110505863 | A | 11/2019 |
| EP | 3607928 | A1 | 2/2020 |
| JP | 2016-519979 | A | 7/2016 |
| JP | 2017-529117 | A | 10/2017 |
| KR | 10-2017-0034351 | A | 3/2017 |
| WO | 2018/186361 | A1 | 10/2015 |
| WO | 2016012834 | A1 | 1/2016 |

OTHER PUBLICATIONS

Extended European Search Report issued Oct. 18, 2024 in European Application 21919553.4.

International Search Report and Written Opinion mailed Jan. 18, 2022 in International Application PCT/JP2021/042266.

* cited by examiner

CONNECTOR

CROSS-REFERENCE TO RELATED APPLICATIONS

The present application is a continuation of International Application PCT/JP2021/042266, filed Nov. 17, 2021, which claims the benefit of priority from Japanese Patent Application No. 2021-004407, filed Jan. 14, 2021, the entire contents of all of which are incorporated herein by reference.

FIELD

The invention relates to a connector for fluidically connecting a first device and a second device.

BACKGROUND

Conventionally, in order to fluidically connect a container such as a vial to a device such as a syringe for supplying a fluid or a device for receiving the fluid supply, a technique of using a connector to be connected to the container and a connector to be connected to the device and mutually connecting these connectors to establish a fluidic connection between the container and the device has been used.

The connector to which a device is connected has been known to have a configuration in which a housing having a flow path therein and a device securing unit arranged in the housing to allow the device to be screwed in and secured thereto are provided.

Furthermore, a technique has also been known in which a device securing unit is rotatably provided in the housing in such a manner that, with a ratchet, rotation of the device securing unit in a direction of removing the device from the device securing unit is allowed, while rotation of the device securing unit in a direction of screwing the device onto the device securing unit is restricted. By allowing the rotation in the direction of removing the device from the device securing unit, the device is prevented from being removed from the device securing unit (see, for example, Patent Literature 1).

A technique of forming the housing by combining two casings, forming the gear of the ratchet integrally on the outer periphery of the syringe securing unit, and providing a ratchet pawl on one of the two casings, has been known.

PATENT LITERATURE

Patent Literature 1: International Publication No. 2018/186361

SUMMARY

There has been a problem in the above-described configuration for restricting the rotation of the device securing unit with the ratchet, as indicated below. That is, when a force is exerted upon the ratchet in the restricting direction, the direction of the gear abutting the pawl becomes parallel to the protruding direction of a protrusion formed on the split surface of one of the two casings. Then, there is a problem that the force exerted on the device securing unit when the user is trying to secure the device to the device securing unit tends to split the two casings.

Thus, in order to prevent the two casings from being split, an adhesive is used for secure attachment of the two casings, in addition to engagement of a protrusion and a recess.

DETAILED DESCRIPTION

According to one aspect of the present invention, a connector for fluidically connecting a first device and a second device includes: a housing including a first casing that has a first end surface on which a protrusion is formed, and a second casing that has a second end surface in which a recess is formed to be engaged with the protrusion; a connection member formed into a cylinder an interior of which constitutes a first flow path, an intermediate portion of the connection member in an axial direction being rotatably supported by the housing, one end side of the connection member being located outside the housing, a screw portion being formed on the one end side in such a manner that the first device can be screwed into the screw portion; a flow path member formed on the other end of the connection member in such a manner as to communicate with the first flow path, an interior of the flow path member having a second flow path fluidically connected to the second device; and a ratchet including a gear and a pawl, the gear being formed on a peripheral surface on the other end side of the connection member and having a plurality of teeth in a circumferential direction, the teeth respectively having a restricting surface and a climbing surface, and the pawl being formed on the housing and engaged in a direction intersecting with a protruding direction of the protrusion from the first end surface with the restricting surface of the gear that rotates in the screwing direction to restrict rotation of the gear, the pawl climbing the climbing surface of the gear rotating in a direction opposite the screwing direction to allow for the rotation of the gear.

A connector according to an embodiment of the present invention will be described with reference to FIGS. 1 to 6.

Figure 1:
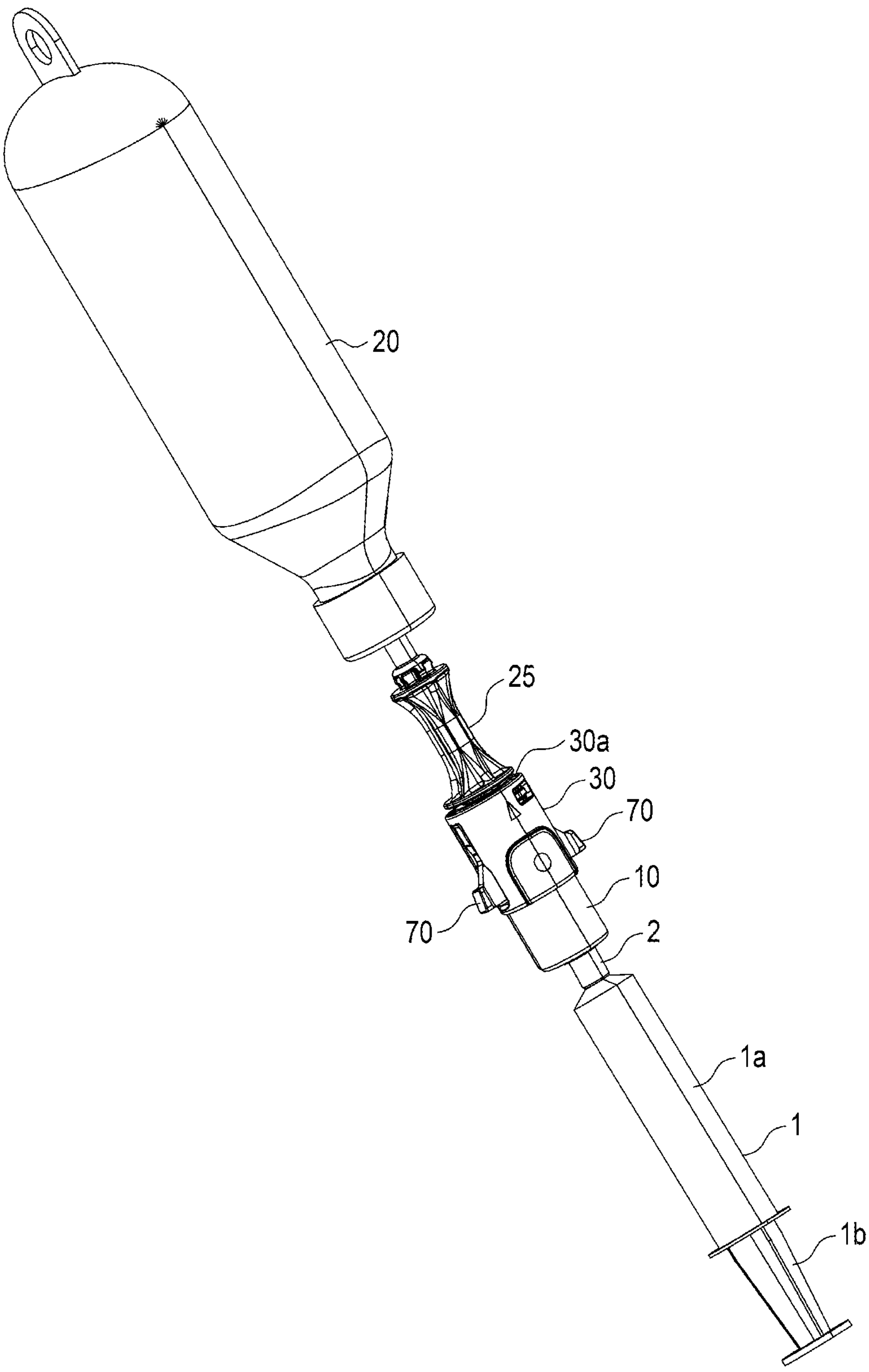
FIG. 1 is a perspective view showing an infusion connector, a syringe, a spike adapter, and an infusion bag according to an embodiment of the present invention.
Figure 2:
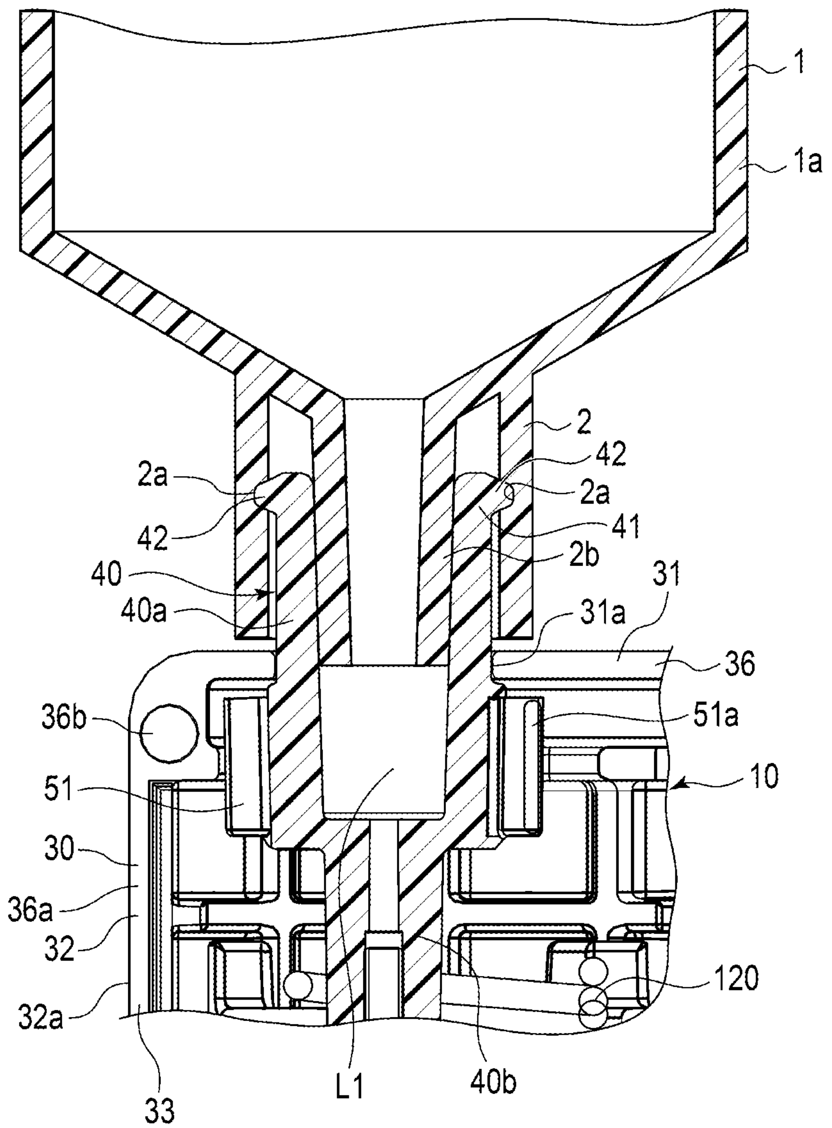
FIG. 2 is a cross section showing the main part of the infusion connector and the syringe.
Figure 3:
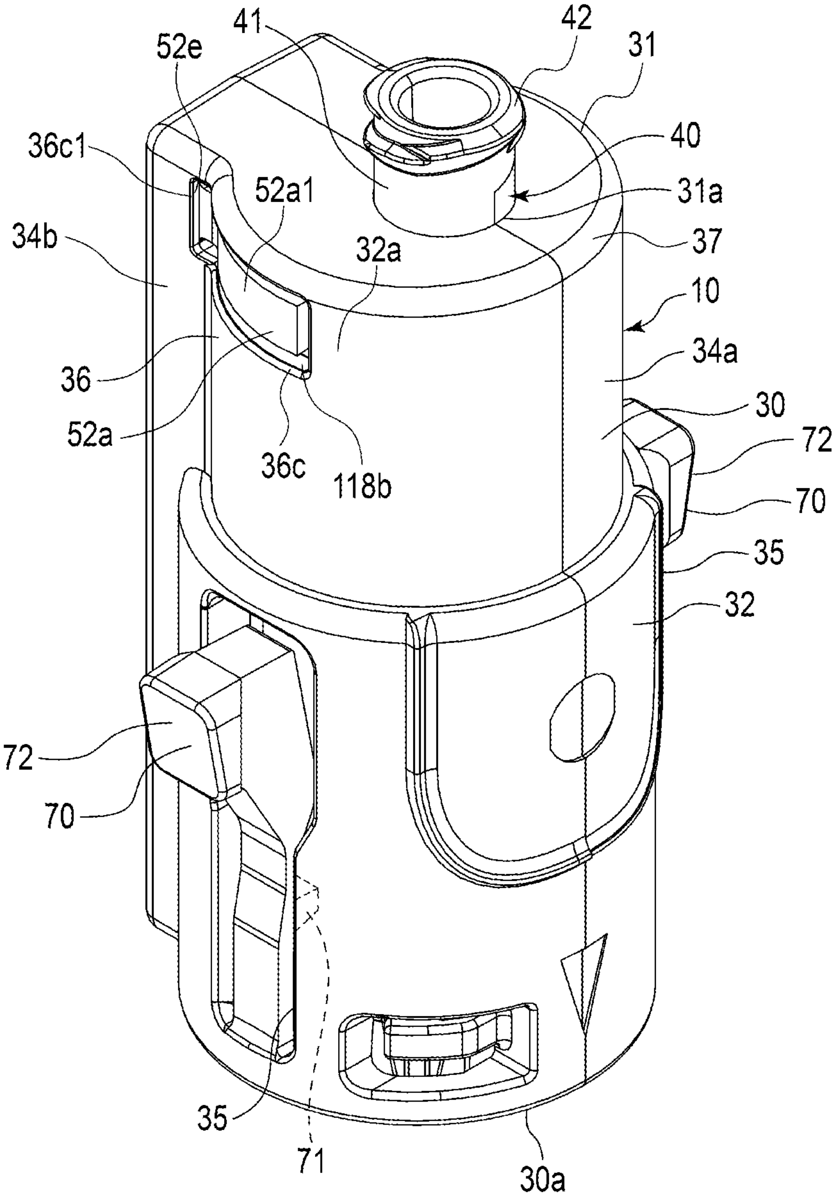
FIG. 3 is a perspective view showing a structure of the infusion connector.
Figure 4:
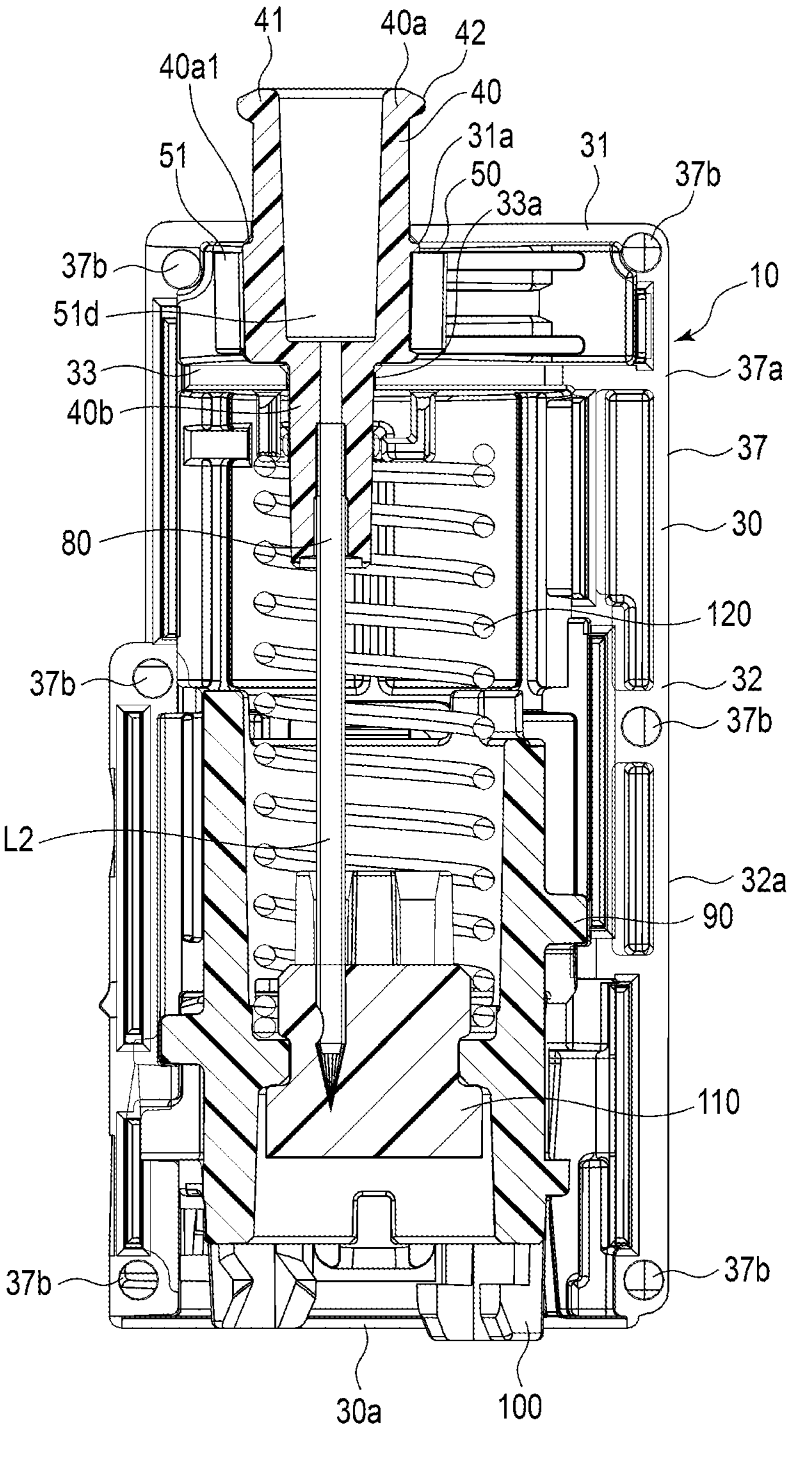
FIG. 4 is a cross section showing the structure of the infusion connector.
Figure 5:
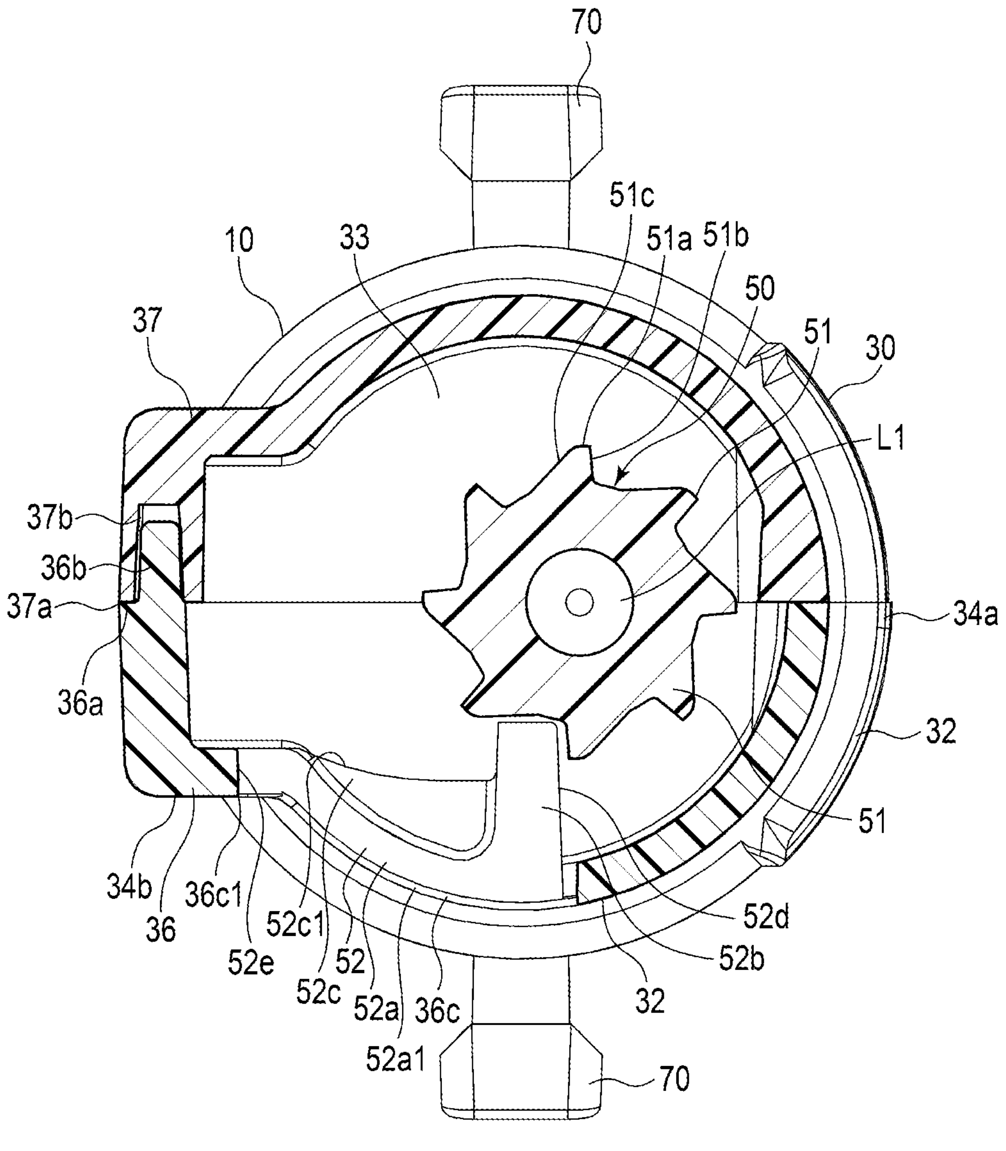
FIG. 5 is a cross section showing the structure of the infusion connector.
Figure 6:
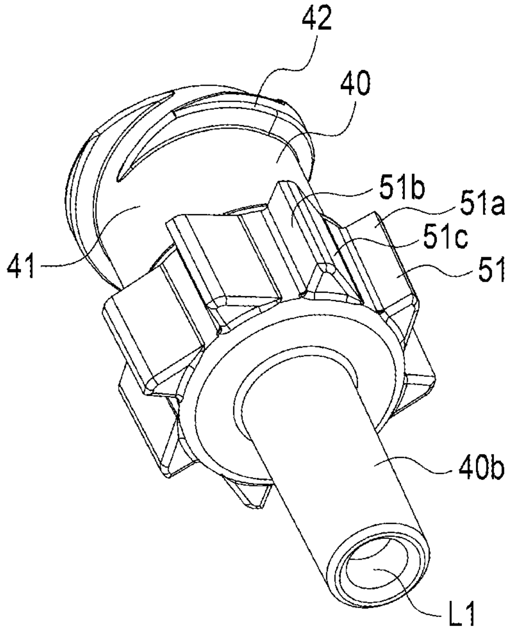
FIG. 6 is a perspective view showing a structure of a connection member of the infusion connector.

FIG. 1 is a perspective view showing an infusion connector 10, a syringe 1, a spike adapter 25, and an infusion bag 20; FIG. 2 is a cross section showing the main part of the infusion connector 10 and the syringe 1; FIG. 3 is a perspective view showing the structure of the infusion connector 10; FIG. 4 is a cross section showing the structure of the infusion connector 10; FIG. 5 is a cross section showing the structure of the infusion connector 10; and FIG. 6 is a perspective view showing the structure of the connection member 40 of the infusion connector 10.

The connector includes: a housing formed by combining two casing members; a connection member rotatably provided in the housing and having a flow path inside, where the first device is screwed into the connection member; a flow path member provided in the housing and connected to the connection member; and a ratchet provided in the housing to restrict the rotation of the connection member in the same direction as the screwing direction. The connector forms a flow path that allows for communication between the first device and the second device, with the first device screwed into the connection member and the second device connected to the housing in such a manner that the flow path member is fluidically connected to the second device.

According to the present embodiment, as illustrated in FIGS. 1 and 2, an infusion connector 10 will be described as an exemplary connector, into which a syringe 1, which is an example of the first device, is screwed. The syringe 1 has an outer cylinder 1*a* and a plunger 1*b*. A cylinder tip 2 and a male Luer 2*b* are provided at the tip of the outer cylinder 1*a*. A screw portion, such as a female screw 2*a*, is formed in the inner surface of the cylinder tip 2. The male Luer 2*b* is formed in the cylinder tip 2. The male Luer 2*b* is formed into a cylindrical shape in such a manner as to communicate with the interior of the outer cylinder 1*a*. The syringe 1 is configured to discharge a fluid contained in the outer cylinder 1*a* through the cylinder tip 2 with the plunger 1*b* manipulated, or to transfer a fluid outside the outer cylinder 1*a* into the outer cylinder 1*a* through the cylinder tip 2.

The infusion connector 10 may be configured in such a manner that a spike adapter 25 connected to the infusion bag 20 can be attached to and detached from the infusion connector 10, where the spike adapter 25 is an example of the second device. The infusion connector 10 forms a flow path connecting the spike adapter 25 and the syringe by connecting the spike adapter 25 to the infusion connector 10. The infusion connector 10, together with the spike adapter 25, also forms a flow path that fluidically connects the infusion bag 20 and the syringe 1. The syringe 1 supplies a medical agent to the infusion bag by way of the infusion connector 10 and the spike adapter 25.

As shown in FIGS. 1 to 6, the infusion connector 10 may include a housing 30; a connection member 40 rotatably supported by the housing 30 and to which the syringe 1 is connected; and a ratchet 50 that restricts the rotation of the connection member 40 in the first direction, which is the same as the screwing direction of the syringe 1 while allowing the rotation in the second direction, which is the same as the opposite direction.

Here, according to the present embodiment, the connection of the syringe 1 to the connection member 40 is the state in which the cylinder tip 2 is screwed into the connection member 40 and the male Luer 2*b* is fitted into the connection member 40. With the male Luer 2*b* fitted into the connection member 40, the outer surface of the male Luer 2*b* establishes a surface contact with the inner surface of the connection member 40 so that the outer surface of the male Luer 2*b* and the inner surface of the connection member 40 can be sealed together.

The infusion connector 10 includes: an engagement member 70 configured to secure the housing 30 and spike adapter 25 and release the engagement; a flow path member 80 provided in the housing 30 and connected to the connection member 40; a cylindrical head sleeve 90 movably housed in the housing 30; a needle seal 110 secured to the head sleeve 90; a stopper sleeve 100 configured to selectively secure the head sleeve 90 to the housing 30 and selectively secure the head sleeve 90 and spike adapter 25; and a bias member 120 configured to bias the head sleeve 90 in a direction pushing it out of the housing 30.

As shown in FIG. 3, the housing 30 is formed by combining a first casing 36 and a second casing 37. The housing 30 may be shaped into a cylinder with its end closed and the other end opened. In particular, the housing 30 includes an end wall portion 31, a barrel portion 32, and a support wall portion 33. A pawl 52 of the ratchet 50, which will be described later, is formed integrally with the housing 30. Part of the spike adapter 25 is inserted into the housing 30 through an opening 30*a* at the above-mentioned other end.

The end wall portion 31 may be formed into a plate having part of the edge shaped into an arc and the remaining part of the edge shaped into a rectangle. A hole 31*a* is formed in the end wall portion 31. In the example of the present embodiment, as shown in FIG. 3, the hole 31*a* is provided, for example, at a position shifted from the center of the arc in the region where the edge is formed into the arc. The hole 31*a* being formed at a position shifted from the center of the arc means that the center of the hole 31*a* is displaced from the center of the arc. In another example, the hole 31*a* may be formed at the center of the arc in the region where the edge of the end wall portion 31 is formed into an arc.

The barrel portion 32 is formed around the edge of the end wall portion 31. The barrel portion 32 is formed into a cylinder such that part of the spike adapter 25 is movable therein. In particular, the barrel portion 32 includes a cylindrical portion 34*a* that is continuous with the outer peripheral edge of the end wall portion 31 where the arc portion is formed, and a rectangular portion 34*b* that is continuous with the outer peripheral edge of the end wall portion 31 where the rectangular portion is formed.

A hole 35 is formed in the lower end portion of the cylindrical portion 34*a*. The hole 35 penetrates through the barrel portion 32 in the radial direction, and is formed into an elongated shape along the axial line of the housing 30. Two holes 35 are formed.

As shown in FIGS. 4 and 5, the support wall portion 33 is formed on the inner surface of the barrel portion 32. The support wall portion 33 rotatably supports the connection member 40. The support wall portion 33 is, for example, a partition wall that partitions the inside of the barrel portion 32 in the axial direction, and has a hole 33*a* through which a small-diameter portion 40*b* of the connection member 40, which will be described later, is rotatably arranged.

The housing 30 having the above configuration is formed by combining the first casing 36 and the second casing 37.

As illustrated in FIG. 5, the casings 36 and 37 have shapes obtained by dividing the housing 30 along a plane that extends through the axial line of the housing 30 and is parallel to the alignment direction of the cylindrical portion 34*a* and the rectangular portion 34*b* of the barrel portion 32. The casing 36 and the casing 37 respectively include a protrusion and a recess, which are engaged with each other when they are attached.

In particular, the first casing 36 has a first end surface 36*a*. The first end surface 36*a* may be formed into a flat surface. The first casing 36 may include a plurality of protrusions 36*b*. The protrusions 36*b* are formed on the first end surface 36*a*. The protrusions 36*b* may be formed on the center side of the first end surface 36*a* in the thickness direction of the first casing 36.

The second casing 37 has a second end surface 37*a*. The second end surface 37*a* may abut on the first end surface 36*a*. The second casing 37 includes a plurality of recesses 37*b*. The recesses 37*b* are formed so as to be engaged with the protrusions 36*b*. The recesses 37*b* are formed in the second end surface 37*a*. The recesses 37*b* are formed on the center side of the second end surface 37*a* in the thickness direction of the second casing 37.

In one of the first casing 36 and the second casing 37, for example in the first casing 36, a hole 36*c* is formed in part of a region in which it faces a gear 51 of the ratchet 50, which will be described later. The hole 36*c* may extend in the circumferential direction about the axial line of the cylindrical portion 34*a* from the end portion of the rectangular portion 34*b* of the first casing 36 on the cylindrical portion 34*a* side to a position approximately opposing to the central axis of the gear 51 of the ratchet 50 in a direction of the protrusion 36*b* protruding from the first end surface 36*a*.

The hole 36*c* has a geometry which allows the first casing 36 to be formed by molding. In particular, the hole 36*c* is formed as a groove, with which the pawl 52 of the ratchet 50 will not become undercut. In addition, the hole 36*c* is formed to have a geometry larger than the pawl 52 in the opposing direction of the first casing 36 and the second casing 37. The hole 36*c* being larger than the pawl 52 in the opposing direction of the casings 36 and 37 means that the hole 36*c* is large enough to arrange the pawl 52 therein in the opposing direction of the casings 36 and 37. In other words, the hole 36*c* is formed, when viewed in the opposing direction of the casings 36 and 37, to have a size such that the pawl 52 can be positioned inside the hole 36*c*.

As illustrated in FIGS. 2 and 6, the connection member 40 is shaped into a cylinder, and formed integrally with the gear 51 of the ratchet 50, which will be described later. The connection member 40 may be formed into a cylinder that has a large-diameter portion 40*a* and a small-diameter portion 40*b*. The inside of the connection member 40 constitutes a flow path L1. In the connection member 40, an intermediate portion of the large-diameter portion 40*a* in the axial direction is arranged in the hole 31*a* of the end wall portion 31 of the housing 30. In the connection member 40, one end side of the large-diameter portion 40*a* opposite to the small-diameter portion 40*b* is arranged outside the housing 30. The remaining portion of the connection member 40, in other words, the portion of the large-diameter portion 40*a* on the small-diameter portion 40*b* side and the small-diameter portion 40*b*, is arranged in the housing 30.

A stopper portion 40*a*1 having a diameter larger than the diameter of the hole 31*a* is formed on the peripheral surface of the large-diameter portion 40*a*. With the abutment of the stopper portion 40*a*1 on the edge of the hole 31*a*, the connection member 40 can be prevented from coming off the housing 30 through the hole 31*a*. A screw portion 42 is formed at one end portion 41 of the large-diameter portion 40*a*, into which the cylinder tip 2 of the syringe 1 is screwed. The screw portion 42 may be a male screw that is screwed into a female screw 2*a* formed on the inner surface of the cylinder tip 2. The inner peripheral surface of the large-diameter portion 40*a* is shaped into a female Luer that matches the male Luer 2*b* of the syringe 1. Here, the female Luer being shaped to match the male Luer 2*b* means that it has a shape such that the outer peripheral surface of the male Luer 2*b* inserted into the large-diameter portion 40*a* establishes a surface contact with the female Luer, as illustrated in FIG. 2.

The small-diameter portion 40*b* is arranged in the hole 33*a* of the support wall portion 33. With the small-diameter portion 40*b* arranged in the hole 33*a*, the end surface of the large-diameter portion 40*a* serves as a stopper so that the connection member 40 can be prevented from moving in a direction away from the end wall portion 31.

The ratchet 50 includes a gear 51 formed integrally with the connection member 40 and a pawl 52 formed integrally with one of the first casing 36 and the second casing 37.

The gear 51 is formed integrally on the peripheral surface of the large-diameter portion 40*a* of the connection member 40 on the small-diameter portion 40*b* side. The gear 51 has a plurality of teeth 51*a* in the circumferential direction of the large-diameter portion 40*a*. The teeth 51*a* include a restricting surface 51*b* and a climbing surface 51*c*.

The restricting surface 51*b* may be formed into the flat surface that abuts on the pawl 52 in a direction intersecting the direction of the protrusion 36*b* protruding from the first end surface 36*a*. In the example of the present embodiment, the intersecting direction indicates an orthogonal direction or a substantially orthogonal direction.

The pawl 52 is formed on the housing 30, and extends toward the gear 51 in a direction orthogonal to the axial direction of the housing 30. The restricting surface 51*b* of the gear 51 rotating in the first direction becomes engaged with the pawl 52 in a direction intersecting the protruding direction of the protrusion 36*b* with respect to the first end surface 36*a* of the first casing 36, and the pawl 52 thereby restricts the rotation of the gear 51 in the first direction. In the example of the present embodiment, the pawl 52 is engaged with the restricting surface 51*b* in a direction orthogonal to or substantially orthogonal to the protruding direction of the protrusion 36*b* with respect to the first end surface 36*a*.

The pawl 52 is arranged in the hole 36*c*. In particular, the pawl 52 includes a main body 52*a*, an abutment portion 52*b*, and a rib 52*c*. When the force applied by the gear 51 that is biased in the first direction exceeds a predetermined value, the main body 52*a* and the rib 52*c* of the pawl 52 are elastically deformed so that the pawl 52 is retracted from the gear 51 to allow the gear 51 to rotate in the first direction. The predetermined value is determined to be smaller than a value at which the syringe 1 and the infusion connector 10 can be damaged.

The main body 52*a* extends from one end 36*c*1 of the hole 36*c* on the rectangular portion 34*b* side along the outer periphery of the barrel portion 32 toward the gear 51 side in a direction that is orthogonal to the axial line of the housing 30 and is oriented from the rectangular portion 34*b* toward the cylindrical portion 34*a*. The main body 52*a* extends from the end 36*c*1 of the hole 36*c* to the vicinity of the other end of the hole 36*c*. One end of the pawl 52 on the end 36*c*1 side of the hole 36*c* will be referred to as a "proximal end 52*e*", and the other end will be referred to as a "distal end". The main body 52*a* creates a clearance with the inner surface of the hole 36*c*. This clearance may be large enough for the main body 52*a* to move within.

The outer surface 52*a*1 of the main body 52*a* is displaced toward the inner side of the barrel portion 32 with respect to the outer surface 32*a* of the barrel portion 32. The outer surface 52*a*1 of the main body 52*a* is a surface exposed outside the housing 30 through the hole 36*c*.

In the example of this embodiment, the displacement amount of the outer surface 52*a*1 with respect to the outer surface 32*a* is determined to be an amount at which the outer surface 52*a*1 of the main body 52*a* would not protrude outward from the outer surface 32*a* of the barrel portion 32 even under the elastic deformation of the pawl 52, which occurs when the climbing surface 51*c* of the gear 51 rotating in the second direction climbs onto the pawl 52. In other words, the displacement amount of the outer surface 52*a*1 with respect to the outer surface 32*a* is an amount at which the outer surface 52*a*1 of the main body 52*a* will remain at the same position as the outer surface 32*a* of the barrel portion 32 or on the inner side of the housing 30 with respect to the outer surface 32*a* even when the pawl 52 is elastically deformed by the climbing surface 51*c* of the gear 51 climbing onto the pawl 52 at the time of the gear 51 rotating in the second direction. The outer surface 52*a*1 being at the same position as the outer surface 32*a* means that the outer surface 52*a*1 is at the same position as a plane extending the outer surface 32*a* over the hole 36*c*.

Alternatively, the displacement amount of the outer surface 52*a*1 with respect to the outer surface 32*a* may be an amount at which the outer surface 52*a*1 will protrude outward from the outer surface 32*a* when the pawl 52 is elastically deformed by the climbing surface 51*c* of the gear 51 climbing onto the pawl 52 at the time of the gear 51 rotating in the second direction.

Furthermore, the displacement amount of the outer surface 52*a*1 toward the inside of the housing 30 with respect to the outer surface 32*a* is an amount at which, when the user presses the hole 36*c* of the barrel portion 32 and its surrounding area with a finger, the abutment portion 52*b* comes to abut on the gear 51 by the main body 52*a* being pressed toward the inner side of the barrel portion 32 with the finger. With the abutment portion 52*b* abutting on the gear 51, the rotation of the gear 51 in the second direction can be restricted.

The abutment portion 52*b* protrudes from the distal end of the main body 52*a* toward the inside of the barrel portion 32 so as to abut on the gear 51. The abutment portion 52*b* is located closer to the gear 51 than the proximal end 52*e* of the main body 52*a* in the protruding direction of the abutment portion 52*b* from the main body 52*a*. The abutment portion 52*b* has a rigidity large enough to be not deformed even under abutment on the gear 51 rotating in the first direction and the second direction. The pawl 52 has an abutment surface 52*d* on which the restricting surface 51*b* abuts. The abutment surface 52*d* may be formed into a flat surface with which the restricting surface 51*b* makes a surface contact or substantially makes a surface contact.

The rib 52*c* is formed along the main body 52*a*, on the inner surface of the main body 52*a*. The inner surface of the main body 52*a* is located on the axial line side of the housing 30. The rib 52*c* extends from the proximal end 52*e* of the main body 52*a* to the abutment portion 52*b*. The rib 52*c* has a thickness smaller than that of the main body 52*a*. The thicknesses of the rib 52*c* are the thickness in a direction orthogonal to both the longitudinal direction of the rib 52*c* and the protruding direction of the rib 52*c* from the main body 52*a*. That is, the thickness of the rib 52*c* is a thickness in a direction orthogonal to both the direction from the proximal end 52*e* of the main body 52*a* toward the distal end and the direction in which the rib 52*c* protrudes from the main body 52*a*.

The thickness of the rib 52*c* and the protruding height of the rib 52*c* from the main body 52*a* are set to a thickness and a protruding height such that, when the pressing force applied from the gear 51 biased in the first direction exceeds a predetermined value, the main body 52*a* and the ribs 52*c* can be elastically deformed, allowing the main body 52*a* and the ribs 52*c* to be retracted to a position where the gear 51 can be rotated in the first direction. The predetermined value is smaller than a value at which the syringe 1 and the infusion connector 10 may be damaged, and is larger than a pressing force generated at the time of screwing in the syringe 1 to the connection member 40 for regular use and applied from the gear 51.

The distal end surface 52*c*1 of the rib 52*c* in the protruding direction is formed into a flat surface on the abutment portion 52*b* side and a curved surface on the proximal end 52*e* side. One end of the rib 52*c* on the abutment portion 52*b* side is connected to an intermediate portion of the abutment portion 52*b* in the protruding direction.

That is, in the example of the present embodiment, the distal end surface 52*c*1 of the pawl 52 is formed into a flat surface with its abutment portion 52*b* side lowered and also into a gently curved continuous surface on its proximal end 52*e* side such that, when the pressing force from the gear 51 biased in the first direction exceeds a predetermined value, the main body 52*a* and the rib 52*c* will be elastically deformed, allowing the main body 52*a* and the ribs 52*c* to be retracted to a position where the gear 51 can be rotated in the first direction.

A plurality of engagement members 70 are provided, and engaged with the spike adapter 25 in a state where the spike adapter 25 is inserted into the housing 30. With the engagement members 70 engaged with the spike adapter 25, the spike adapter 25 is secured to the housing 30 by way of the engagement members 70. When manipulated, the engagement members 70 are released from the engagement with the spike adapter 25. For instance, two engagement members 70 may be provided.

As shown in FIG. 3, the engagement members 70 are respectively formed into a shape elongated in one direction. One end portion of an engagement member 70 is secured to the hole 35 on the opening side of the housing 30. The engagement members 70 may be formed integrally with the housing 30. An engagement portion 71 is provided in an intermediate portion of the engagement member 70 in the longitudinal direction thereof to be engaged with the spike adapter 25, and a manipulation portion 72 is provided at the other end portion of the engagement member 70 to be manipulated by a user.

The engagement portion 71 is engaged with the spike adapter 25 in the state of the flow path member 80 of the infusion connector 10 being inserted into the spike adapter 25. The engagement portion 71 is configured to be released from the engagement with the spike adapter 25 when the manipulation portion 72 is manipulated.

The manipulation portion 72 is arranged outside the barrel portion 32. For instance, when the manipulation portion 72 is manipulated, or more specifically, when it is pressed inward of the barrel portion 32, the manipulation portion 72 moves inward of the barrel portion 32 in comparison with the position prior to the manipulation.

The flow path member 80 constitutes a flow path L2 therein. The flow path member 80 may be a needle member. An opening is formed at each of the ends of the flow path member 80 to communicate with the flow path L2. In the example of this embodiment, the opening of the end of the flow path member 80 on the seal 110 side is formed in the side surface of the flow path member 80. As illustrated in FIG. 4, one end of the flow path member 80 is secured inside the small-diameter portion 40*b* of the connection member 40. The flow path member 80 communicates with the flow path L1 in the connection member 40.

The head sleeve 90 is accommodated in the housing 30. As illustrated in FIG. 4, the head sleeve 90 is shaped into a cylinder that is movable inside the housing 30.

The stopper sleeve 100 is secured to the outer peripheral surface of the head sleeve 90. The stopper sleeve 100 is configured to selectively restrict the movement of the head sleeve 90 with respect to the housing 30 and to selectively secure the head sleeve 90 to the spike adapter 25.

The needle seal 110 is provided in the stopper sleeve 100 as shown in FIG. 4. The needle seal 110 seals the opening at the distal end of the flow path member 80, or in other words, on the side of the flow path member 80 being inserted into the spike adapter 25. The needle seal 110 is formed of a resin such as rubber or elastomer, and is formed in such a manner that it can seal, with its resilience, the hole formed by the flow path member 80 in a liquid-tight and air-tight manner after the flow path member 80 is moved.

When the spike adapter 25 is inserted into the housing 30 and the head sleeve 90 moves toward the end wall portion 31 side, the flow path member 80 penetrates the needle seal 110.

As shown in FIG. 4, the bias member 120 is accommodated in the housing 30 and biases the head sleeve 90 toward the opening side of the housing 30. The bias member 120 may be a coil spring.

In the infusion connector 10 configured as described above, when the spike adapter 25 is inserted into the housing 30, the head sleeve 90 and the stopper sleeve 100, which are integrally combined, move together with the spike adapter 25 inside the housing 30 toward the end wall portion 31.

In the process of moving together with the spike adapter 25 to the position where the flow path member 80 is inserted into the spike adapter 25, the head sleeve 90 and the stopper sleeve 100 that are integrally combined are secured to the spike adapter 25. This secured state can be achieved by engaging an engaging portion such as an arm member provided on the stopper sleeve 100 with an engaged portion such as a recess provided in the outer peripheral surface of the spike adapter 25.

Furthermore, when the spike adapter 25 is moved in a direction of being pulled out of the housing 30 from the state in which the flow path member 80 is inserted into the spike adapter 25 with the head sleeve 90 and the stopper sleeve 100 secured to the spike adapter 25, the head sleeve 90, stopper sleeve 100, and spike adapter 25 are integrally moved inside the housing 30 toward the opening side of the housing 30 under the biasing force of the bias member 120.

The secured state between the spike adapter 25 and the integrally combined head sleeve 90 and stopper sleeve 100 is released when the head sleeve 90 and stopper sleeve 100 move to the end portion of the housing 30 on the opening side and the flow path member 80 comes out of the spike adapter 25.

Next, an exemplary operation of connecting the syringe 1 to the infusion connector 10 will be described.

As illustrated in FIG. 2, the user places the distal end of the cylinder tip 2 of the syringe 1 in alignment with one end of the large-diameter portion 40*a* of the connection member 40.

Next, by rotating the syringe 1, the user screws the screw portion 42 of the connection member 40 into the female screw 2*a* on the inner surface of the cylinder tip 2. The user rotates the syringe 1 until its rotation with respect to the connection member 40 is restricted. When the screw portion 42 is screwed into the female screw portion 2*a* on the inner surface of the cylinder tip 2, the male Luer 2*b* in the cylinder tip 2 is inserted into the female Luer on the inner surface of the connection member 40. The user rotates the syringe 1 until the female Luer and the male Luer are completely joined, or in other words, until the outer peripheral surface of the male Luer 2*b* comes into surface contact with the inner peripheral surface of the large-diameter portion 40*a* of the connection member 40 so that the outer peripheral surface and the inner peripheral surface can be sealed together. Thus, the syringe 1 is rotated until the rotation of the syringe 1 with respect to the connection member 40 is restricted.

The force applied to the connection member 40 by rotating the syringe 1 to rotate the connection member 40 is exerted in the first direction. The restricting surface 51*b* of the teeth 51*a* of the gear 51 thereby abuts on the abutment portion 52*b* of the pawl 52. Under this abutment, the abutment portion 52*b* and the restricting surface 51*b* are engaged with each other in a direction intersecting the protruding direction of the protrusion 36*b* with respect to the first end surface 36*a* of the first casing 36. As a result, the rotation of the connection member 40 in the first direction, which is the same as the direction of screwing in the syringe 1, is restricted.

With the syringe 1 having been fully rotated, the connection operation of the syringe 1 and the infusion connector 10 is completed. Here, the full rotation of the syringe 1 means that the syringe 1 has been rotated to a position where the rotation of the syringe 1 is restricted by the ratchet 50 so that the syringe 1 can be rotated no further.

The ratchet 50 allows for the rotation in the second direction, which is a rotation in the same direction as the rotation for removing the syringe 1. Thus, with this infusion connector 10, even if the syringe 1 is rotated in an attempt to remove it from the infusion connector 10, the syringe 1 and the connection member 40 rotate integrally with each other so that the syringe 1 can be prevented from being removed from the infusion connector 10.

With this infusion connector 10, however, it is possible to remove the syringe 1 if the necessity to remove the syringe 1 from the infusion connector 10 arises. An exemplary operation of removing the syringe 1 from the infusion connector 10 will be described.

When removing the syringe 1 from the connection member 40, the user presses the outer surface 52*a*1 of the main body 52*a* of the pawl 52 with a finger. Pressing the outer surface 52*a*1 with a finger is pressing of the outer surface 52*a*1 with a force that would not move the pawl 52 outward when rotating the syringe 1 in the second direction for the removal of the syringe 1 from the infusion connector 10. By pressing the main body 52*a* with a finger, the main body 52*a* is prevented from bending toward the outside of the housing 30. Since the bending of the main body 52*a* toward the outside of the housing 30 is prevented, the climbing surface 51*c* is prevented from climbing onto the abutment portion 52*b*. As a result, the rotation of the gear 51 in the second direction can be restricted.

The user presses the main body 52*a* so that the rotation of the gear 51 can be restricted in the second direction and the syringe 1 can be rotated in the second direction, which is the direction of removing the syringe 1 from the connection member 40. Since the rotation of the gear 51 in the second direction is restricted, the connection member 40 will not rotate integrally with the syringe 1 even by rotating the syringe 1 in the direction of removing the syringe 1 from the connection member 40. By rotating the syringe 1 until the syringe 1 is detached from the connection member 40, the operation of removing the syringe 1 from the connection member 40 is completed.

With the infusion connector 10 configured as described above, when the gear 51 of the ratchet 50 is rotated in the first direction, which is the restricting direction, the restricting surface 51*b* abuts on the pawl 52 in the direction intersecting the direction of the protrusion 36*b* protruding from the first end surface 36*a* of the first casing 36. This engages the restricting surface 51*b* with the abutment portion 52*b* so that the rotation of the gear 51 in the first direction can be restricted.

As a result, even when the gear 51 is rotated in the first direction, the protrusion 36*b* is in contact with the inner surface of the recess 37*b* in the direction along the end surfaces 36*a* and 37*a*, and therefore the casings 36 and 37 can be prevented from being displaced along the end surfaces 36*a* and 37*a*.

Furthermore, since the restricting surface 51*b* of the gear 51 abuts on the abutment portion 52*b* in the direction intersecting the protruding direction of the protrusion 36*b* with respect to the first end surface 36*a*, only part of the force applied from the restricting surface 51*b* to the abutment portion 52*b* is exerted in the direction of releasing the engagement between the protrusion 36*b* and the recess 37*b* of the casings 36 and 37. The direction of releasing the engagement between the protrusion 36*b* and the recess 37*b* is the direction of pulling the protrusion 36*b* from the recess 37*b*.

Since the secured state of the casings 36 and 37 can be maintained through the engagement force of the recess 37*b* and the protrusion 36*b*, there is no need to use an adhesive for securing the casings 36 and 37.

Furthermore, since the direction of the restricting surface 51*b* of the gear 51 abutting on the abutment portion 52*b* is substantially orthogonal to the direction of the protrusion 36*b* protruding from the first end surface 36*a*, the force exerted in the direction of releasing the engagement between the protrusion 36*b* and the recess 37*b* can be reduced. In addition, since the direction in which the restricting surface 51*b* of the gear 51 abuts on the abutment portion 52*b* is substantially orthogonal to the direction of the protrusion 36*b* protruding from the first end surface 36*a*, the generation of a force that would release the engagement between the protrusion 36*b* and the recess 37*b* can be prevented.

Furthermore, the first casing 36 is provided with a hole 36*c*. This means that the first casing 36 can be formed by molding. That is, even though the pawl 52 extends in the direction intersecting with the direction of demolding the mold for forming the first casing 36, the pawl 52 can be prevented from becoming undercut because of the structure in which the first casing 36 has the hole 36*c* and one end of the pawl 52 is provided at one end of this hole 36*c*. This allows the first casing 36 to be formed by molding.

The pawl 52 includes a main body 52*a*, an abutment portion 52*b*, and a rib 52*c*, where the rib 52*c* extends from one end of the main body 52*a* to the abutment portion 52*b*. This allows for the area in which the rib 52*c* is formed to be increased, which can enhance the strength of the pawl 52. Thus, the force for restricting the rotation of the gear 51 can be increased with a simple configuration.

Furthermore, by setting the geometry of the rib 52*c* to a desired geometry, the restricting force of the ratchet 50 can be set to a desired level. The restricting force of the ratchet 50 therefore can be determined to be a force that can elastically deform the main body 52*a* and the rib 52*c* so as to retract the abutment portion 52*b* from the gear 51 before the force applied from the gear 51 to the pawl 52 at the time of rotating the gear 51 in the first direction reaches either one of the force damaging the syringe 1 and the force damaging the infusion connector 10, whichever is smaller. In this manner, damage to the syringe 1 and the infusion connector 10 can be prevented. Here, the damage to the syringe 1 may be damage to the female screw 2*a* on the cylinder tip 2. The damage to the infusion connector 10 may be damage to the ratchet 50 or to the screw portion 42.

In addition, with the main body 52*a* arranged in the hole 36*c*, the user can restrict the rotation of the gear 51 in the second direction by pressing the main body 52*a* from the outside of the housing 30 so as to bring the abutment portion 52*b* into abutment on the climbing surface 51*c* of the gear 51.

If a need arises to remove the syringe 1 from the infusion connector 10, the rotation of the gear 51 in the second direction can be restricted by pressing the main body 52*a* so that the syringe 1 can be removed from the connection member 40.

The abutment portion 52*b* is located closer to the gear 51 than the proximal end 52*e* of the main body 52*a* in the direction of the abutment portion 52*b* protruding from the main body 52*a*. This allows the main body 52*a* and the rib 52*c* to be elastically deformed, and therefore the pawl 52 can be retracted from the gear 51.

The outer surface 52*a*1 of the main body 52*a* of the pawl 52 is arranged at a position displaced from the outer surface 32*a* of the housing 30 toward the inner side of the housing 30. Thus, when the pawl 52 is elastically deformed by the climbing surface 51*c* of the gear 51 climbing onto the abutment portion 52*b* at the time of the gear 51 rotating in the second direction, the amount of protrusion of the pawl 52 to the outside of the housing 30 can be reduced.

As described above, with the pawl 52 elastically deforming and the outer surface 52*a*1 of the pawl 52 protruding from the outer surface 32*a* to the outside of the housing 30, the user can easily stop the ratchet 50. Here, stopping the ratchet 50 means stopping the rotation of the gear 51 in the second direction, which is the direction of allowing for the rotation. If there is no need to stop the ratchet 50, the amount of protrusion of the outer surface 52*a*1 can be reduced so that the burden on the user's finger can be lessened when pressing the outer surface 52*a*1 with the finger.

The displacement amount of the outer surface 52*a*1 of the main body 52*a* with respect to the outer surface 32*a* of the housing 30 can be set to an amount at which the outer surface 52*a*1 will not protrude from the outer surface 32*a* to the outside of the housing 30 when the climbing surface 51*c* climbs onto the abutment portion 52*b*. In this manner, it is possible to prevent the user from unintentionally touching the main body 52*a*. That is, since the rotation of the gear 51 in the second direction can be prevented from being unintentionally restricted by the user, unintentional detachment of the syringe 1 from the connection member 40 can be prevented.

In the above-described example, the configuration of the pawl 52 of the ratchet 50 including a main body 52*a*, an abutment portion 52$b$, and a rib 52$c$, where the main body 52$a$ is shaped to extend along the circumferential direction of the housing 30, has been described. The configuration, however, is not limited thereto.

Figure 7:
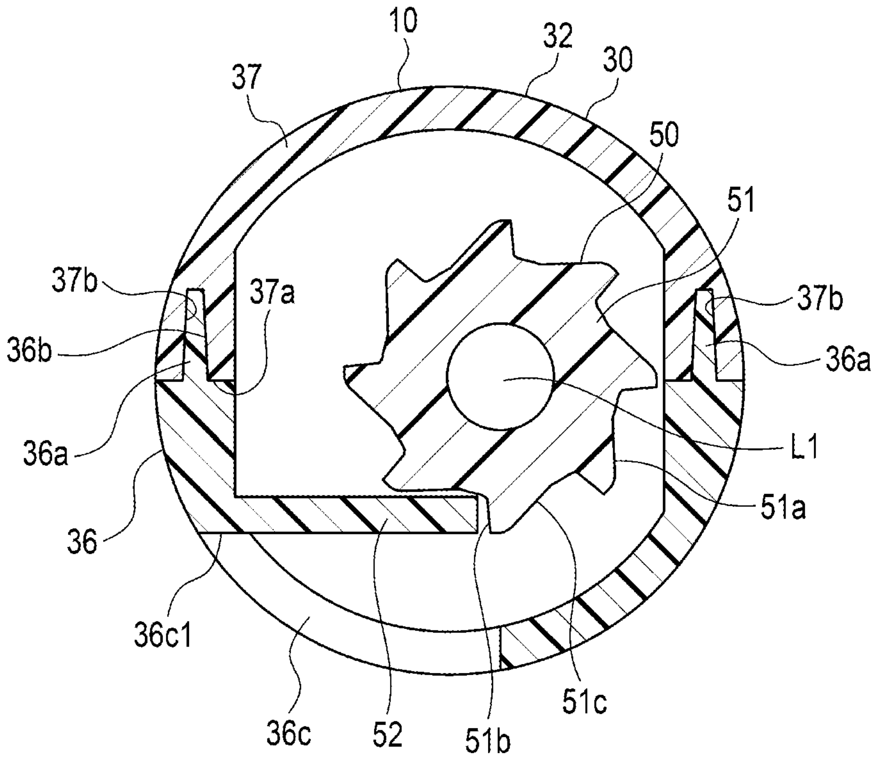
FIG. 7 is a cross section showing a structure of a ratchet adopted in the infusion connector according to a modification example.

In another example, as illustrated in FIG. 7, the pawl 52 may be shaped to extend linearly toward the gear 51. In this configuration, the pawl 52 may not include an abutment portion 52$b$ and a rib 52$c$.

In the above example, the configuration of the housing 30 having the hole 36$c$ has been described, which is not a limitation. For instance, if the housing 30 can be formed integrally with the pawl 52 by molding without a hole 36$c$, the housing 30 may not be provided with a hole 36$c$.

In addition, in the above example, the configuration of the spike adapter 25 serving as the second device and connected to the infusion connector 10 has been described, which is not a limitation. In another example, the second device may be a bag adapter 25A, as indicated in FIG. 8.

Figure 8:
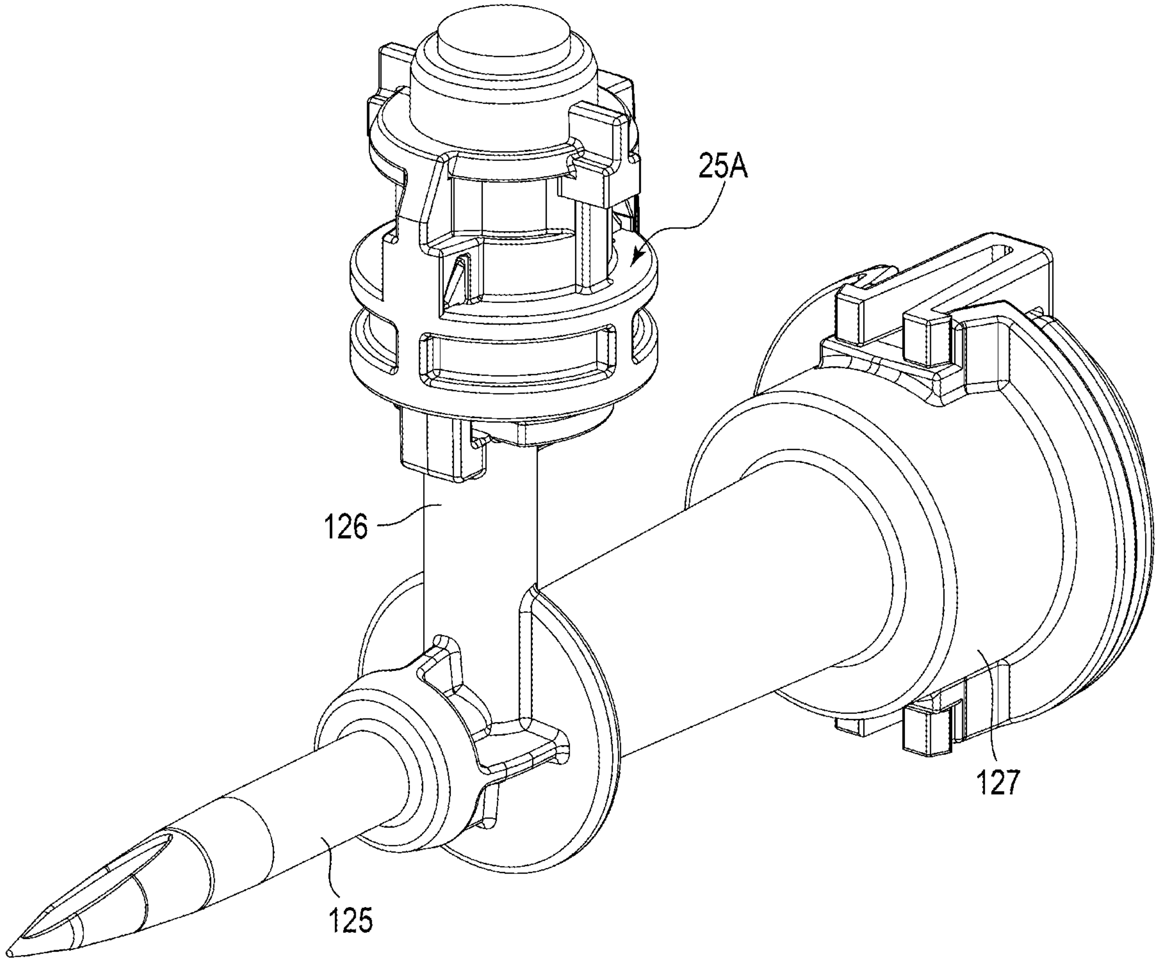
FIG. 8 is a perspective view showing a structure of a bag adapter, which is a modification example of a second device connected to the infusion connector.

FIG. 8 is a perspective view showing the structure of the bag adapter 25A. As shown in FIG. 8, the bag adapter 25A includes a spike portion 125, a first device connecting portion 126, and a second device connecting portion 127.

The spike portion 125, when being inserted into the infusion bag 20, is connected to the infusion bag 20. The first device connecting portion 126 is connected to the infusion connector 10. The first device connecting portion 126 may have the same configuration as a portion of the spike adapter 25 that is inserted into the housing 30. The second device connecting portion 127 is connected to a third device, which is a device that supplies a fluid to the infusion bag 20 through the bag adapter 25A or is supplied with the fluid from the infusion bag 20 through the bag adapter 25A. The third device may be a component through which a fluid flows, such as a tube.

With the bag adapter 25A having the first device connecting portion 126 connected to the infusion connector 10 and the spike portion 125 connected to the infusion bag 20, a flow path for fluidically connecting the syringe 1 and the infusion bag 20 can be formed by the infusion connector 10, the first device connecting portion 126, and the spike portion 125.

Furthermore, with the bag adapter 25A having the spike portion 125 connected to the infusion bag 20 and the third device connected to the second device connecting portion 127, a flow path for fluidically connecting the infusion bag 20 and the third device can be formed by the spike portion 125 and the second device connecting portion 127. These flow paths are independently provided.

Figure 9:
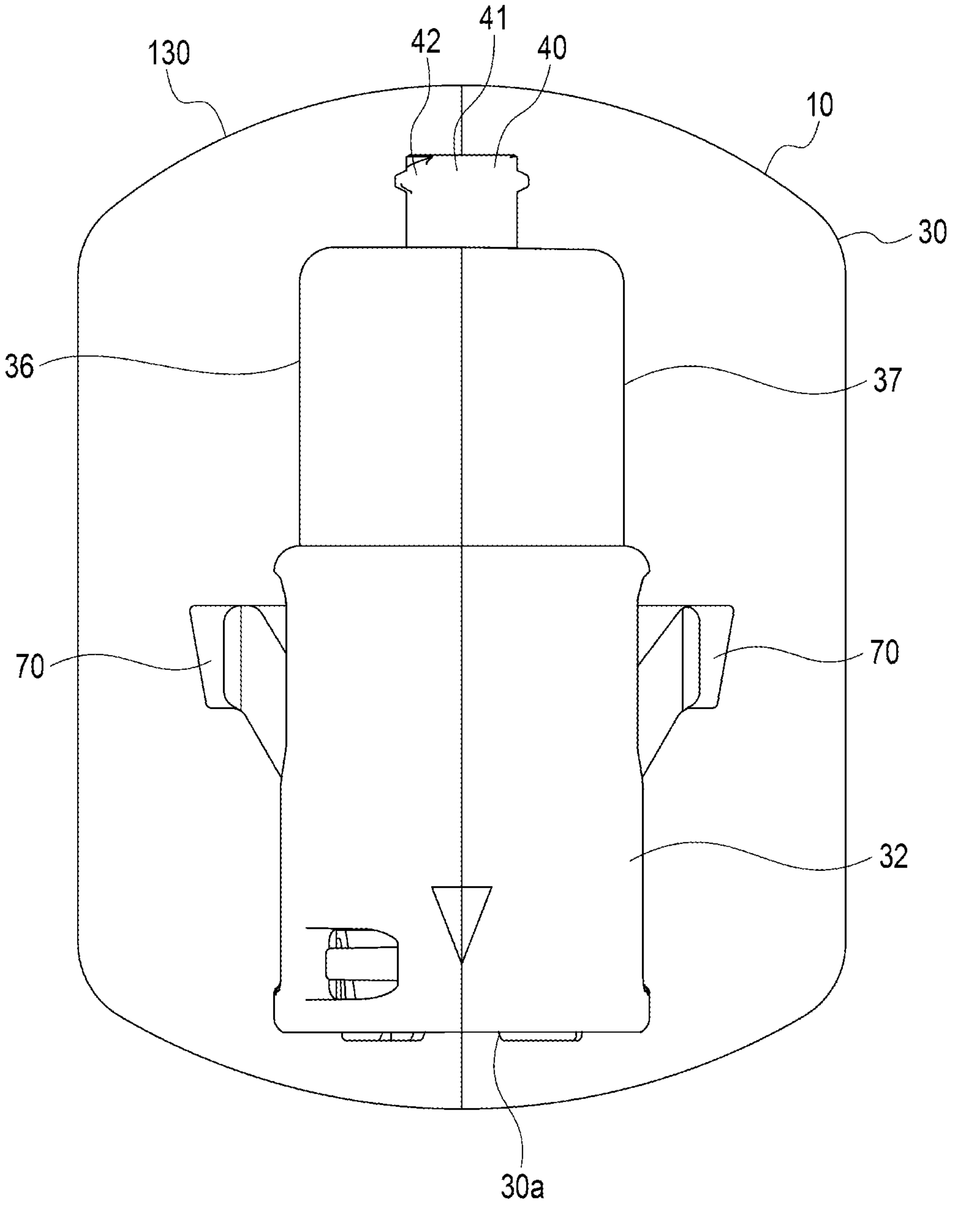
FIG. 9 is a front view showing a structure of a syringe adapter according to a modification example of the present invention.
Figure 10:
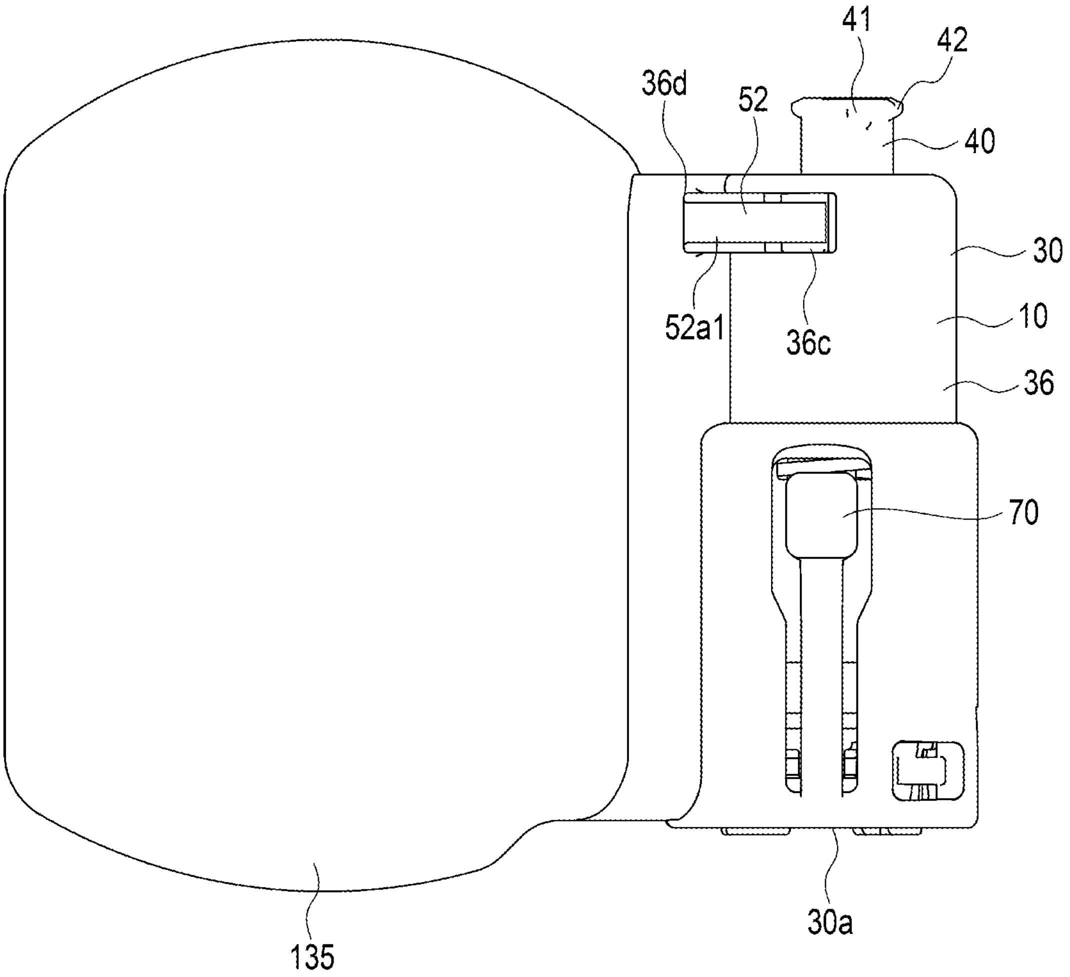
FIG. 10 is a side view showing the structure of the syringe adapter.
Figure 11:
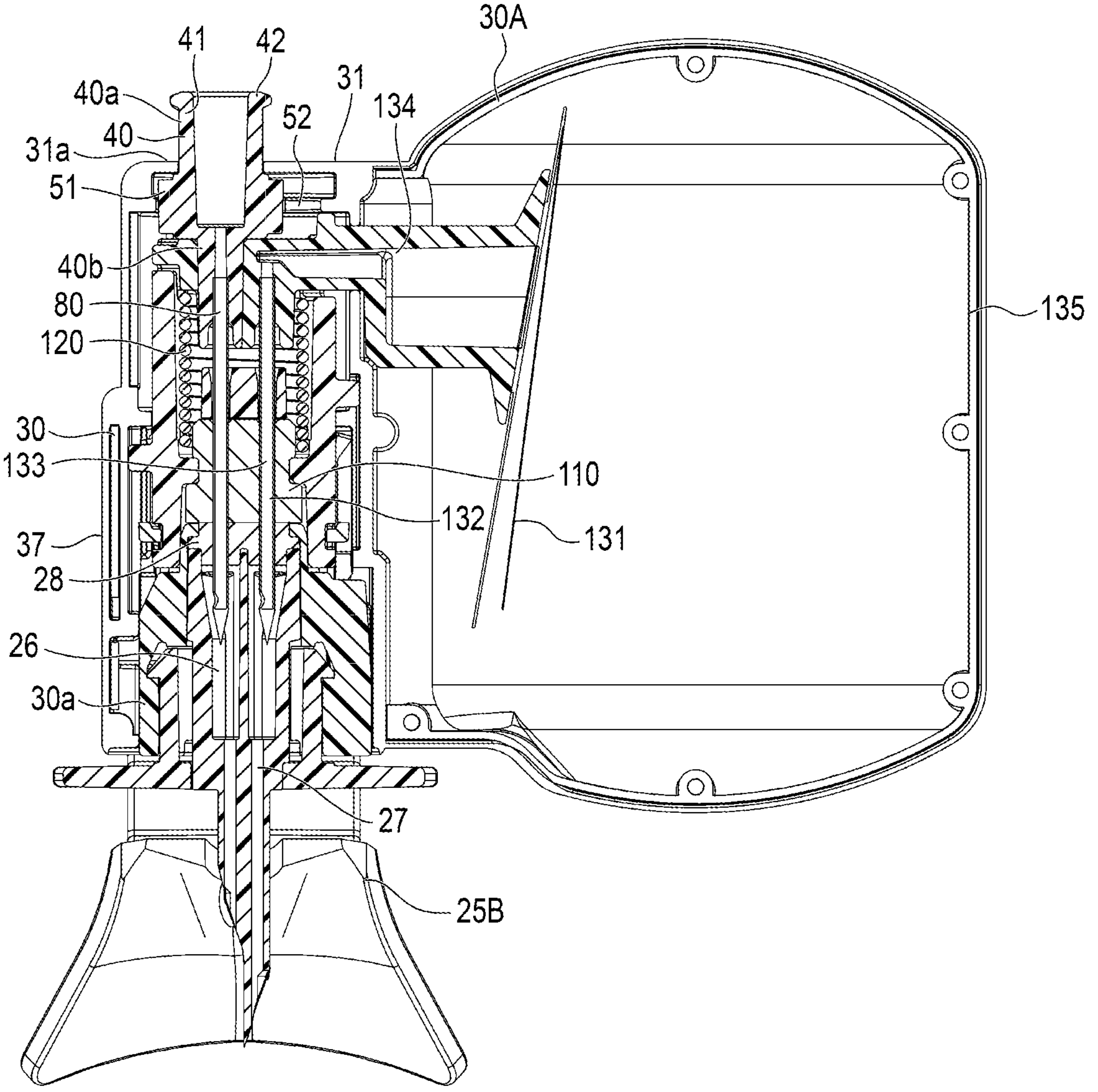
FIG. 11 is a cross section showing the structure of the syringe adapter.

In the above-described example, the infusion connector 10 has been described as an exemplary connector, but the connector is not limited to the infusion connector 10. In another example, as shown in FIGS. 9 to 11, the connector may be a syringe adapter 130, to which a container adapter 25B is connected as the second device. In the syringe adapter 130, components having the same functions as those of the infusion connector 10 will be referred to by the same reference numerals as those of the infusion connector 10, and the description thereof will be omitted.

FIG. 9 is a front view showing the structure of the syringe adapter 130, FIG. 10 is a side view showing the structure of the syringe adapter 130, and FIG. 11 is a cross-section showing a state in which the container adapter 25B is connected to the syringe adapter 130.

As shown in FIGS. 9 to 11, the container adapter 25B is connected to a container such as a vial. The container adapter 25B has two flow paths 26 and 27 therein. The flow paths 26 and 27 are sealed at one end by a seal 28. When the container adapter 25B is connected to the container, these two flow paths 26 and 27 communicate with the interior of the container.

The syringe adapter 130 may include a housing 30A; a connection member 40 which is rotatably supported by the housing 30A and into which the cylinder tip 2 of the syringe 1 is screwed; a ratchet 50; an engagement member 70 which secures the housing 30A and the container adapter 25B and releases their secured state; a flow path member 80 which is provided in the housing 30A and is connected to the connection member 40; a cylindrical head sleeve 90 movably housed in the housing 30A; a needle seal 110 secured to the head sleeve 90; a stopper sleeve 100 configured to selectively secure the head sleeve 90 to the housing 30A and selectively secure the head sleeve 90 to the container adapter 25B; a bias member 120 for biasing the head sleeve 90 in the direction of pushing it out of the housing 30A; an air bag 131; and a gas flow path 132 communicating with the air bag 131 and being connectable to the container adapter 25B.

The housing 30A includes an end wall portion 31, a barrel portion 32, a support wall portion 33, and an air bag storage portion 135. The air bag storage portion 135 stores the air bag 131 therein. The air bag storage portion 135 may be formed integrally with the rectangular portion 34$b$ on the side opposite to the cylindrical portion 34$a$.

The gas flow path 132 may include a gas needle 133 and a flow path portion 134 that fluidically connects the gas needle 133 and the air bag 131.

When the container adapter 25B is connected to the syringe adapter 130, the flow path member 80 penetrates the seals 110 and 28 and is inserted into the flow path 26 so as to communicate with the flow path 26. When the container adapter 25B is connected to the syringe adapter 130, the gas needle 133 penetrates the seals 110 and 28 and is inserted into the flow path 27 so as to communicate with the flow path 27.

Such a syringe adapter 130 constitutes together with the container adapter 25B a flow path for connecting the container and the syringe 1. The syringe adapter 130 also constitutes together with the container adapter 25B a flow path for connecting the container and the air bag 131.

With such a syringe adapter 130, when a medicament or the like is moved from the syringe 1 to a container and thereby the volume of the content such as the medicament or air in the container increases, the air in the container moves to the air bag 131 through the flow path 27 and the flow path portion 134. The pressure in the container thereby remains constant.

Figure 12:
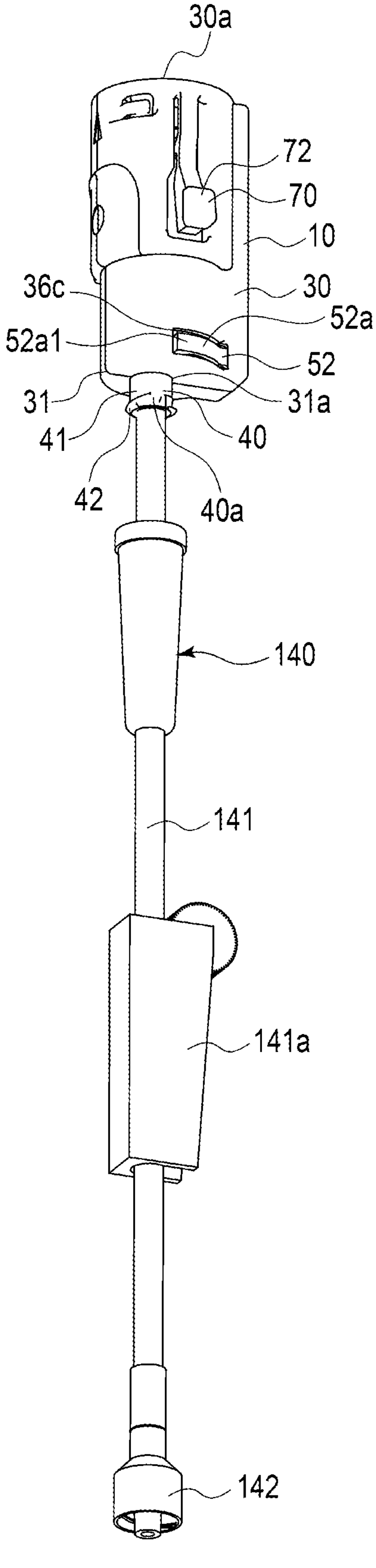
FIG. 12 is a perspective view showing a structure of the infusion connector to which an infusion set is connected.
Figure 13:
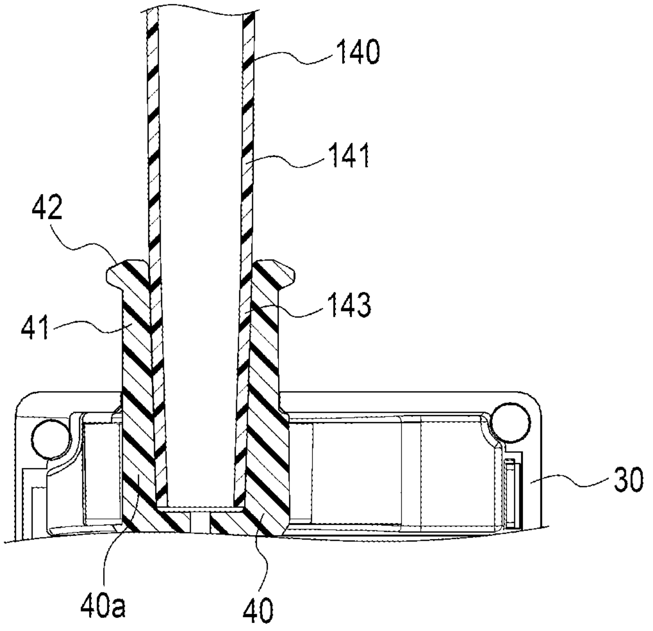
FIG. 13 is a cross section showing the main part of the infusion connector and the infusion set.

For the infusion connector 10 and the syringe adapter 130 in the above example, the structure in which the syringe 1 is connected as the first device to the connection member 40 has been described, which is not a limitation. In another example, an infusion set 140 may be connected, as shown in FIGS. 12 and 13. FIG. 12 is a perspective view showing a structure in which an infusion set 140 is connected to the infusion connector 10. FIG. 13 is a cross-section showing the main part of the infusion connector 10 and the infusion set 140.

As shown in FIGS. 12 and 13, the infusion set 140 includes at least a tube 141. In the present modification example, the infusion set 140 includes a tube 141 and a connection portion 142.

One end portion 143 of the tube 141 is connected to the connection member 40. In particular, as shown in FIG. 12, the end portion 143 is inserted into and secured to the large-diameter portion 40$a$. The end portion 143 may be secured to the large-diameter portion 40$a$ by securing means such as bonding with an adhesive or welding. The tube 141 may include an adjustment portion 141*a* configured to adjust the volume of fluid flowing through the tube 141.

The connection portion 142 is provided at the other end of the tube 141. The connection portion 142 is configured to be connectable to a connection target to which the tube 141 is fluidically connected. The connection portion 142 may be a Luer lock.

Figure 14:
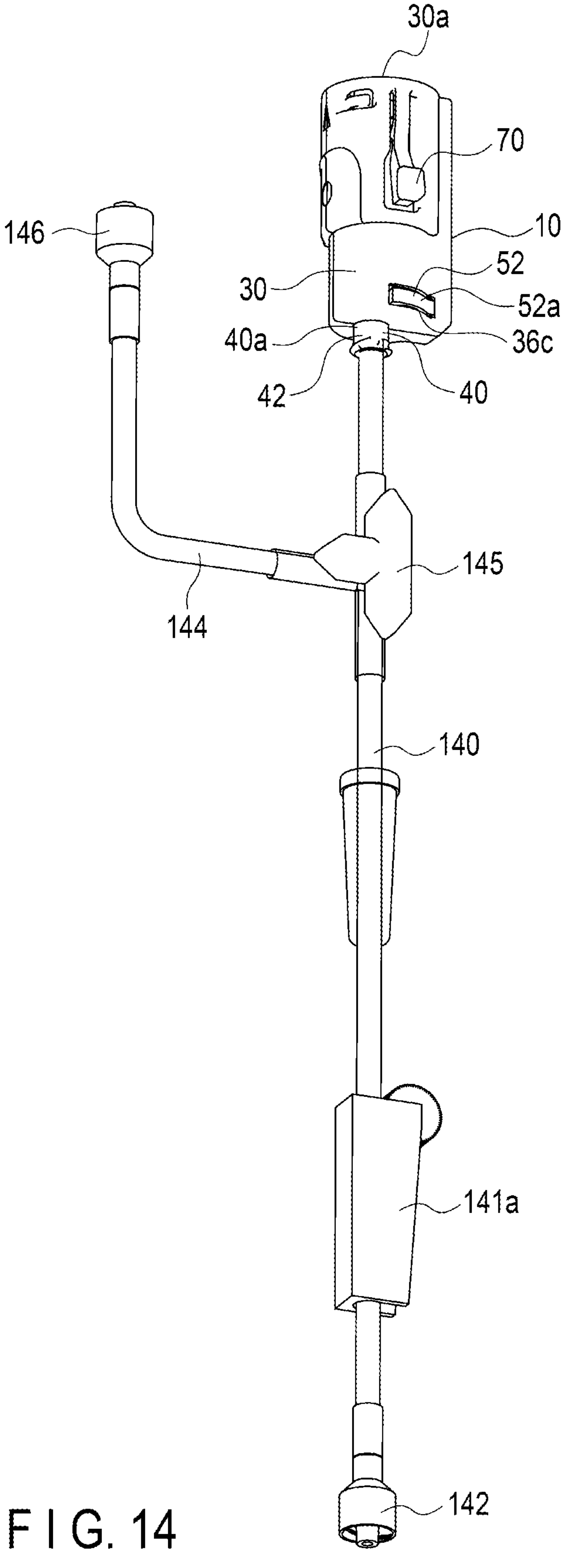
FIG. 14 is a perspective view showing a structure of the infusion set according to a modification example.

As a modification example of the infusion set 140, the tube 141 may be provided with a flow path portion 144, which includes one or more branches, as shown in FIG. 14. The structure of FIG. 14 shows the tube 141 including one flow path portion 144. The tube 141 may be further provided with a valve 145 for selecting a flow path communicating with the infusion connector 10. The valve 145 is capable of switching between a state in which the infusion connector 10 and one of the flow path portions 144 communicate with each other while the infusion connector 10 and the connection portion 142 are interrupted and a state in which the infusion connector 10 and the flow path portion 144 are interrupted while the infusion connector 10 and the connection portion 142 communicate with each other.

Figure 15:
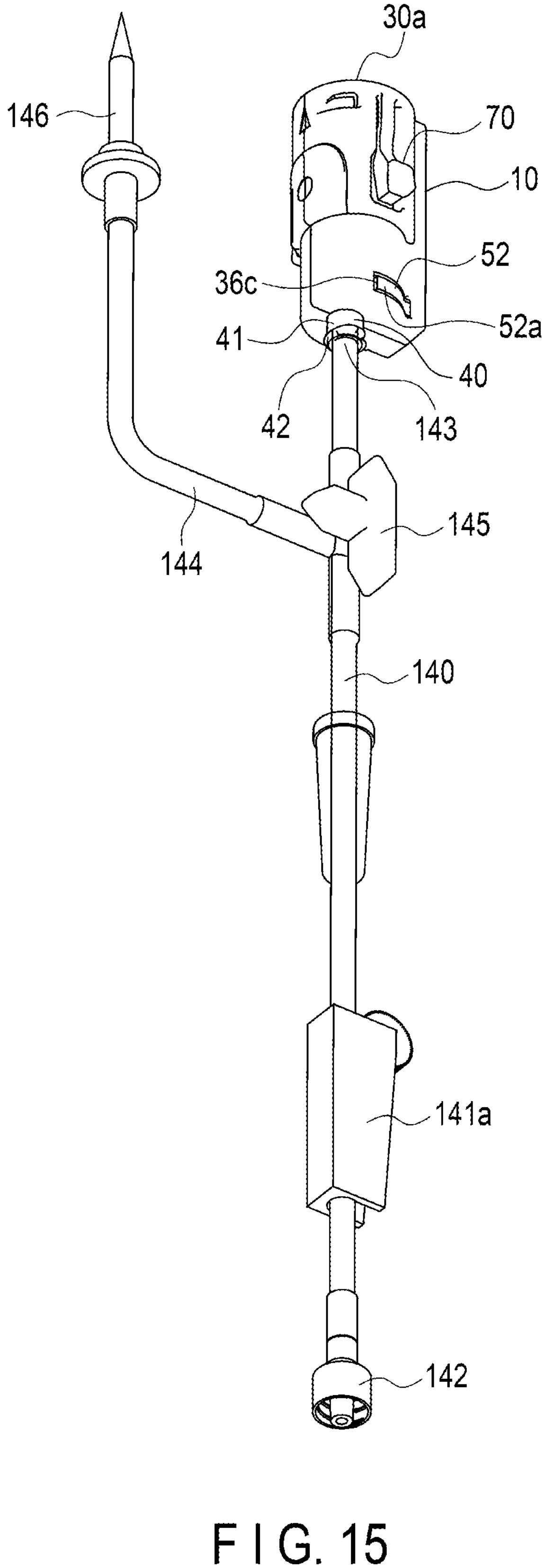
FIG. 15 is a perspective view showing a structure of the infusion set according to a modification example.

The flow path portion 144 branching from the tube 141 may be provided at its end with a connection portion 146 connectable to a connection target to which the flow path portion 144 is fluidically connected. The connection portion 146 may be a Luer lock, as illustrated in FIG. 14. Alternatively, as shown in FIG. 15, the connection portion 146 may be a spike.

Figure 16:
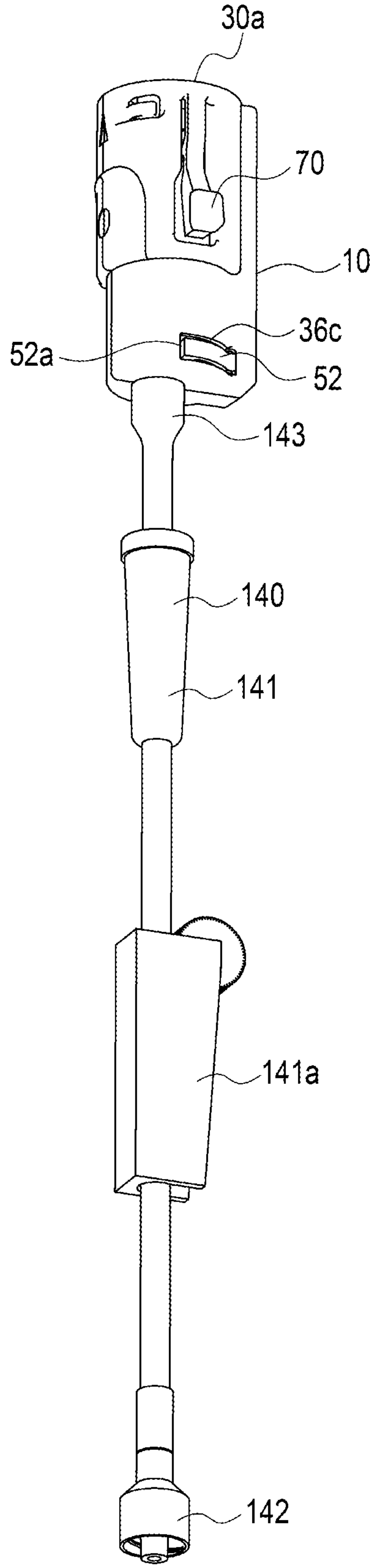
FIG. 16 is a perspective view showing a structure of the infusion set according to a modification example.
Figure 17:
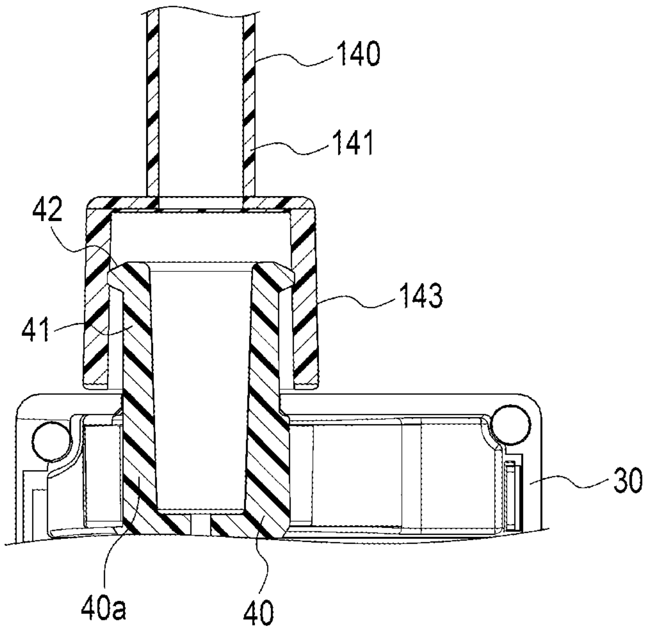
FIG. 17 is a cross section showing the main part of the infusion connector and the infusion set.

In addition, in the example described above, the configuration in which the tube 141 of the infusion set 140 is inserted into and secured to the large-diameter portion 40*a* has been described, but the configuration is not limited thereto. In another example, as shown in FIGS. 16 and 17, the large-diameter portion 40*a* may be secured inside the end portion 143. The large-diameter portion 40*a* may be secured inside the end portion 143 by bonding with an adhesive or welding.

Figure 18:
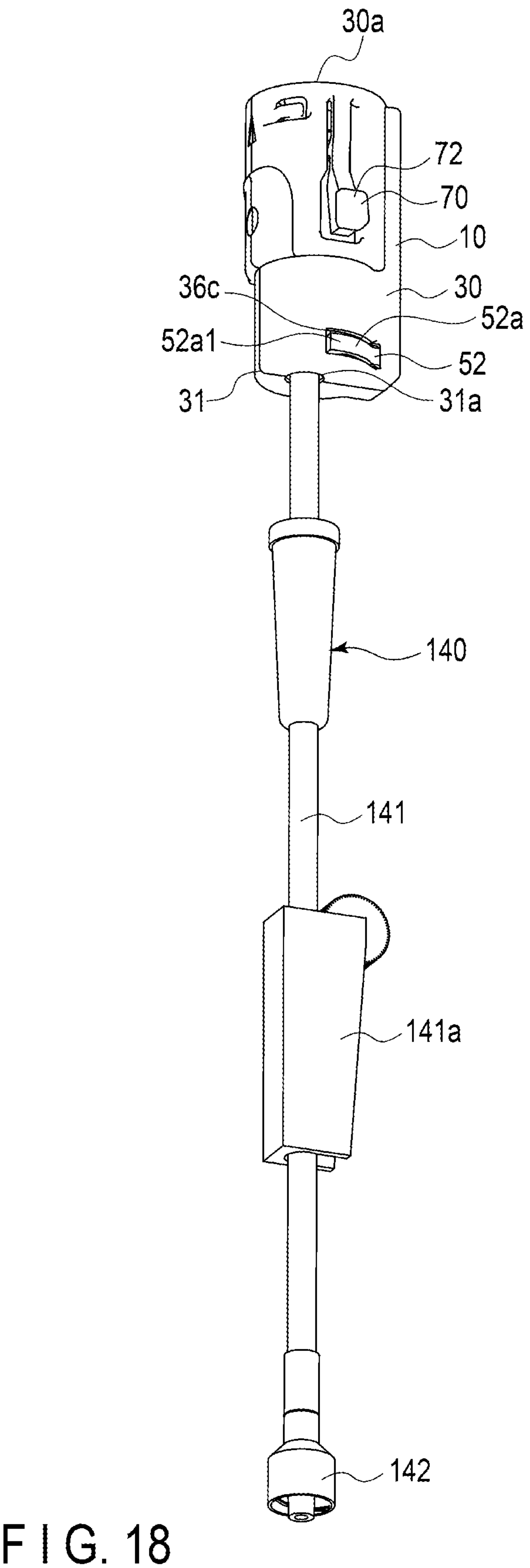
FIG. 18 is a perspective view showing a structure of the infusion connector and the infusion set.

Alternatively, as shown in FIG. 18, the connection member 40 may be formed into such a shape as to be disposed inside the housing 30, without a portion provided outside the housing 30. In this example, the large-diameter portion 40*a* of the connection member 40 may have a length that would not extend to the outside of the housing 30 in the axial direction. The end portion 143 of the tube 141 may be secured inside the connection member 40 in the housing 30, or may be secured with the connection member 40 disposed inside.

The present invention is not limited to the above embodiment, and various other modifications can be made without departing from the gist of the present invention at an implementation stage. The embodiments may be suitably combined with one another, and in such a case, combined effects can be achieved. Furthermore, various inventions are included in the above-described embodiments, and various inventions can be extracted through a combination of structural elements selected from the disclosed structural elements. For instance, even if some of the structural elements are omitted from the elements shown in the embodiment, a configuration with these structural elements omitted can be extracted as an invention, if the problem can be solved and the effects can be attained.

REFERENCE SIGNS LIST

1 . . . syringe, 2 . . . cylinder tip, 10 . . . infusion connector, 20 . . . infusion bag, 25 . . . spike adapter, 25A . . . bag adapter, 25B . . . container adapter, 26 . . . flow path, 27 . . . flow path, 28 . . . seal, 30 . . . housing, 30*a* . . . opening, 30A . . . housing, 31 . . . end wall portion, 31*a* . . . hole, 32 . . . barrel portion, 32*a* . . . outer surface, 33 . . . support wall portion, 33*a* . . . hole, 34*a* . . . cylindrical portion, 34*b* . . . rectangular portion, 35 . . . hole, 36 . . . first casing, 36*a* . . . first end surface, 36*b* . . . protrusion, 36*c* . . . hole, 37 . . . second casing, 37*a* . . . second end surface, 37*b* . . . recess, 40 . . . connection member, 40*a* . . . large-diameter portion, 40*a*1 . . . stopper portion, 40*b* . . . small-diameter portion, 41 . . . one end portion, 42 . . . screw portion, 50 . . . ratchet, 51 . . . gear, 51*a* . . . teeth, 51*b* . . . restricting surface, 51*c* . . . climbing surface, 52 . . . pawl, 52*a* . . . main body, 52*a*1 . . . outer surface, 52*b* . . . abutment portion, 52*c* . . . rib, 52*c*1 . . . distal end surface, 52*d* . . . abutment surface, 52*e* . . . proximal end, 80 . . . flow path member, 130 . . . syringe adapter, L1 . . . flow path, L2 . . . flow path

What is claimed:

1. A connector for fluidically connecting a first device and a second device, the connector comprising:

a housing including a first casing that has a first end surface on which a protrusion is formed, and a second casing that has a second end surface in which a recess is formed to be engaged with the protrusion;

a connection member formed into a cylinder an interior of which constitutes a first flow path, an intermediate portion of the connection member in an axial direction being rotatably supported by the housing, one end side of the connection member being located outside the housing, a screw portion being formed on the one end side in such a manner that the first device can be screwed into the screw portion;

a flow path member formed on the other end of the connection member in such a manner as to communicate with the first flow path, an interior of the flow path member having a second flow path fluidically connected to the second device; and a ratchet including a gear and a pawl, the gear being formed on a peripheral surface on the other end side of the connection member and having a plurality of teeth in a circumferential direction, the teeth respectively having a restricting surface and a climbing surface, and the pawl being formed on the housing and engaged in a direction orthogonal to a protruding direction of the protrusion from the first end surface with the restricting surface of the gear that rotates in the screwing direction to restrict rotation of the gear, the pawl climbing the climbing surface of the gear rotating in a direction opposite the screwing direction to allow for the rotation of the gear.

2. The connector according to claim 1, wherein the housing includes a hole facing the pawl positioned in an opposing direction of the first casing, and the hole is large enough to arrange the pawl therein in the opposing direction.

3. The connector according to claim 2, wherein the hole is formed into a shape elongated in a circumferential direction of the housing, and the pawl includes a main body arranged in the hole and extending from one end of the hole to the other end of the hole, an abutment portion arranged at a distal end of the main body and protruding toward the gear so as to abut on the teeth, and a rib arranged on the main body on an inner side of the housing and extending from one end of the main body to the abutment portion.

4. The connector according to claim 3, wherein the distal end of the abutment portion is located on the gear side in a protruding direction of the abutment portion with respect to a proximal end of the main body.

5. The connector according to claim 3, wherein a first outer surface of the main body exposed on an outer side of the housing is displaced to a position toward an inner side of the housing with respect to a second outer surface of the housing.

6. The connector according to claim 5, wherein a displacement amount of the first outer surface with respect to the second outer surface is determined to be an amount at which the first outer surface is at a same position as the second outer surface or is located inside the housing with respect to the second outer surface when the climbing surface climbs the abutment portion.

* * * * *